United States Patent [19]
Handlin, Jr. et al.

[11] Patent Number: 5,955,559
[45] Date of Patent: Sep. 21, 1999

[54] CAST POLYURETHANE ELASTOMERS CONTAINING LOW POLARITY AMINE CURING AGENTS

[75] Inventors: Dale Lee Handlin, Jr.; Steven Soohyun Chin, both of Houston, Tex.; Aisa Sendijarevic; Vahid Sendijarevic, both of Troy, Mich.; Kurt C. Frisch, Grosse Ille, Mich.

[73] Assignee: Shell Oil Company, Houston, Tex.

[21] Appl. No.: 08/929,174

[22] Filed: Sep. 8, 1997

Related U.S. Application Data

[60] Provisional application No. 60/026,201, Sep. 17, 1996.
[51] Int. Cl.$^6$ .......................... C08G 18/32; C08G 18/38; C08G 18/62
[52] U.S. Cl. ................. 528/63; 528/64; 528/75; 528/85
[58] Field of Search .................. 528/63, 64, 75, 528/85

[56] References Cited

U.S. PATENT DOCUMENTS

| | | | |
|---|---|---|---|
| 4,835,210 | 5/1989 | Chin et al. | 524/732 |
| 5,059,672 | 10/1991 | Engebretson | 528/64 |
| 5,376,745 | 12/1994 | Handlin, Jr. et al. | 526/178 |
| 5,393,843 | 2/1995 | Handlin, Jr. et al. | 525/332.8 |
| 5,405,911 | 4/1995 | Handlin, Jr. et al. | 525/139 |
| 5,589,543 | 12/1996 | Yokelson et al. | 525/131 |
| 5,594,072 | 1/1997 | Handlin, Jr. et al. | 525/314 |

*Primary Examiner*—Rabon Sergent
*Attorney, Agent, or Firm*—Donald F. Haas

[57] ABSTRACT

Cast polyurethanes are preferably formed from a hydrogenated polydiene diol having from up to 2 terminal hydroxyl groups per molecule and a number average molecular weight between 1000 and 20,000, an isocyanate having two or more isocyanate groups per molecule. This composition is then reacted with an amine curing agent at 80 to 130° C. to form a cast elastomer with excellent hydrolytic stability. The amine curing agent must be a hindered aromatic amine crosslinker with low polarity and a solubility parameter of less than 10.5.

17 Claims, No Drawings

CAST POLYURETHANE ELASTOMERS CONTAINING LOW POLARITY AMINE CURING AGENTS

CROSSREFERENCE TO RELATED APPLICATIONS

This application claims the benefit of U.S. provisional application Ser. No. 60/026,201, filed September 17, 1996.

FIELD OF THE INVENTION

This invention relates to cast elastomer compositions produced from a polymeric diol, especially polyurethane compositions produced from anionically polymerized hydrocarbon diols having two terminal hydroxyl groups having excellent hydrolytic stability.

BACKGROUND OF THE INVENTION

Cast and thermoplastic polyurethane compositions based on the reaction of polyisocyanates with polymeric diols are well known for use as elastomers, adhesives, sealants, elastomeric surface coatings, and coatings for metals and plastics. Cast elastomers are often used by molders to make high temperature resistant elastomers for specialty applications because the crosslinking produced by the amine or multifunctional polyol curing agents provides good resistance to creep and flow at high temperatures. However, cast elastomers based on traditional soft segments such as polyester or polyether diols typically have poor resistance to hydrolysis.

Polyurethane cast elastomers are typically made by one of two processes: one-shot, or prepolymer. The one-shot process is a single step process in which the isocyanate, polydiene diol, amine curing agent, and optional chain extenders are mixed then cured in a mold to form the finished article.

More commonly, the two step prepolymer process is used. In the first step a prepolymer is made by reacting the isocyanate with the polydiene diol and, optionally, a chain extending diol to form an isocyanate capped prepolymer. In the second step this prepolymer is then reacted with one or more amine curing agents and, optionally, a chain extending diol to form an isocyanate capped prepolymer. In the second step this prepolymer is then reacted with one or more amine curing agents and, optionally, additional isocyanate. This mixture is then cured in a mold to form the finished cast elastomer article. Cast elastomer articles are typically post cured to achieve final properties. Additional isocyanate is added in the second step to adjust the hard segment content of the elastomer, allowing a single prepolymer to be used to make materials with a wide range of hardnesses. The term hard segment content refers to the fraction of the composition that consists of the amine curing agent, optional chain extenders, and all of the isocyanate, both from the prepolymer and any added in the final step. The soft segment refers only to the polydiene polymer component. Because the final cast elastomer is crosslinked it is not necessary that the functionality of the polymeric diol or the isocyanate be exactly two.

The most common amine crosslinkers (curing agents) used in making cast elastomers are highly polar aromatic amines such as methylene bis(2-chloroaniline) (MCBA). When standard curing agents such as MCBA are used to try to make cast elastomers with the hydrogenated polydienes of the present invention, the materials produced have poor properties. When exposed to hot water aging, the properties improve rather than degrading, indicating poor initial cure.

It is an object of the present invention to provide cast polyurethane compositions with excellent properties using the hydrogenated polydiene diols of this invention. We have now found amine curing agents with low polarity form excellent cast elastomers with the diol/isocyanate prepolymers. We have shown that these materials have hydrolysis resistance far beyond industry standard materials.

SUMMARY OF THE INVENTION

The present invention is a cast polyurethane elastomeric composition which incorporates a hydrogenated or unhydrogenated polydiene diol or polyol. The polyurethane composition is preferably produced by reaction of a hydrogenated polydiene diol having up to about 2, preferably 1.8 to 2, and most preferably 1.9 to 2, terminal hydroxyl groups per molecule and a number average molecular weight between 1000 and 20,000. The polydiene diol is hydrogenated to remove at least 90%, preferably at least 95%, of the original olefinic unsaturation. The polydiene diols are reacted with an isocyanate having two isocyanate groups per molecule, optionally with a low molecular weight chain extender having two hydroxyl groups per molecule, and with an amine curing agent. This mixture is cured at temperature up to 130° C. and may be post cured to develop final properties. This reaction may be done by either the one-shot process in which all components are mixed in one step, or, more preferably, by the prepolymer method in which the isocyanate and polydiene diols are reacted to form a prepolymer which is then reacted with an amine curing agent in a second step to form the cast elastomer. The amine curing agent must be a hindered aromatic amine crosslinker which has a relatively low polarity as determined by a solubility parameter of less than 10.5 $(cal/cm^3)^{0.5}$.

DETAILED DESCRIPTION OF THE INVENTION

Polymers containing ethylenic unsaturation can be prepared by copolymerizing one or more olefins, particularly diolefins, by themselves or with one or more alkenyl aromatic hydrocarbon monomers. The copolymers, may, of course, be random, tapered, block or a combination of these, as well as linear, radial, or star.

The polymers containing ethylenic unsaturation or both aromatic and ethylenic unsaturation may be prepared using anionic initiators or polymerization catalysts. Such polymers may be prepared using bulk, solution or emulsion techniques. When polymerized to high molecular weight, the polymer containing at least ethylenic unsaturation will, generally, be recovered as solid such as a crumb, a powder, a pellet, or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula $RLi_n$ wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl(vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The hydroxy terminated polymers of this invention are generally diols when the polymer is linear. When the polymers are diols, they will have up to about 2, preferably 1.8 to 2, most preferably 1.9 to 2, terminal hydroxy groups per molecule. Polymers with more hydroxy groups are also within the scope herein, i.e., if the pre polymer method is used, the total OH functionality should not be more than about 3 but if the one shot method is used, the total OH functionality can be much higher since it is intended that the final composition will be highly crosslinked. Radial and star polymers are also contemplated herein and, in such case, the polymer would be polyols wherein a hydroxy group is located at the ends of most or all of the arms of such polymers.

The hydroxy functional polydiene polymers may have molecular weights of from about 500 to about 500,000. Lower molecular weights produce very stiff materials whereas higher molecular weights cause very high viscosity, making processing very difficult. More preferably, the polymer is one having a molecular weight of from about 1,000 to about 50,000. Most preferably, the polymer is a predominately linear diol having a molecular weight of from about 1,000 to about 20,000 because this offers the best balance between cost, ability to use the mildest curing conditions, and to achieve good processing behavior.

Hydrogenated polybutadiene diols are preferred for use herein because they are easily prepared and they have low glass transition temperatures, excellent hydrolysis resistance, and excellent weatherability. The diols, dihydroxylated polybutadienes, are synthesized by anionic polymerization of conjugated diene hydrocarbons with lithium initiators. Polyols can be synthesized in the same manner. This process is well known as described in U.S. Pat. No. 4,039,593 and U.S. Pat. No. Re. 27,145 which descriptions are incorporated herein by reference. Polymerization commences with a monolithium, dilithium, or polylithium initiator which builds a living polymer backbone at each lithium site. Typical monolithium living polymer structures containing conjugated diene hydrocarbons are:

| | |
|---|---|
| X—B—Li | X—$B_1$—$B_2$—Li |
| X—A—B—Li | X—A—$B_1$—$B_2$—Li |
| X—A—B—A—Li | | wherein B represents polymerized units of one or more conjugated diene hydrocarbons such as butadiene or isoprene, A represents polymerized units of one or more vinyl aromatic compounds such as styrene, and X is the residue of a monolithium initiator such as sec-butyllithium. B can also be a copolymer of a conjugated diene and a vinyl aromatic compound. $B_1$ and $B_2$ are formed of different dienes.

Dihydroxylated polydiene diols used in this invention may also be prepared anionically such as described in U.S. Pat. Nos. 5,391,663; 5,393,843; 5,405,911; and 5,416,168 which are incorporated by reference herein. The dihydroxylated polydiene polymer can be made using a di-lithium initiator, such as the compound formed by reaction of two moles of sec-butyllithium with one mole of diisopropenyl-benzene. This diinitiator is used to polymerize a diene in a solvent typically composed of 90% w cyclohexane and 10% w diethylether. The molar ratio of diinitiator to monomer determines the molecular weight of the polymer. The living polymer is then capped with two moles of ethylene oxide and terminated with two moles of methanol to yield the desired dihydroxy polydiene.

Dihydroxylated diene polymers can also be made using a mono-lithium initiator which contains a hydroxyl group which has been blocked as the silyl ether. Details of the polymerization procedure can be found in U.S. Pat. No. 5,376,745 which is herein incorporated by reference. A suitable initiator is hydroxypropyllithium in which the hydroxyl group is blocked as the tert-butyl-dimethylsilylether. This monolithium initiator can be used to polymerize isoprene or butadiene in hydrocarbon or polar solvent. The living polymer is then capped with ethylene oxide and terminated with methanol. The silyl ether is then removed by acid catalyzed cleavage in the presence of water yielding the desired polymer.

A dihydroxy polybutadiene unsaturated polymer within the scope of this invention can have any butadiene microstructure. However, it preferably should have less than about 10% 1,2-butadiene addition in order to minimize its viscosity. A dihydroxy polybutadiene polymer to be used after hydrogenation can also have any butadiene microstructure. However, it is preferred that it have no less than about 30% 1,2-butadiene addition because, after hydrogenation, the polymer would be a waxy solid at room temperature if it contained less than about 30% 1,2-butadiene addition and, when used in the process of this invention, it would give a semicrystalline solid at room temperature instead of an elastomer. Therefore, compositions based on a hydrogenated polybutadiene diol having less than about 30% 1,2-butadiene addition would have maintained at a temperature high enough during mixing to assure that the composition is a homogeneous liquid.

Although a hydrogenated polybutadiene having a 1,2-butadiene addition greater than about 30% will give compositions within this invention which are liquids at room temperature, it is preferred that the 1,2-butadiene content should be between about 40 and 60% to minimize viscosity of the hydrogenated polybutadiene diol.

When one of the conjugated dienes is 1,3-butadiene and is to be hydrogenated, the anionic polymerization of the conjugated diene hydrocarbons is typically controlled with structure modifiers such as diethylether or glyme (1,2-diethoxyethane) to obtain the desired amount of 1,4-addition. As described in U.S. Pat. No. Re. 27,145 which is incorporated by reference herein, the level of 1,2-addition of a butadiene polymer or copolymer can greatly affect elastomeric properties after hydrogenation. Similarly, linear unsaturated or hydrogenated isoprene diol polymers should have greater than 80%, 1,4-addition of the isoprene, preferably greater than 90% 1,4-addition of the isoprene, in order to reduce the viscosity of the polymer. Polyisoprene diols of this type can be prepared by anionic polymerization in the absence of microstructure modifiers that increase 3,4-addition of the isoprene. The diene microstructures are typically determined by $C^{13}$ nuclear magnetic resonance (NMR) in chloroform.

A preferred method of making the preferred diol polymers of the present invention involves the use of lithium initiators having the structure:

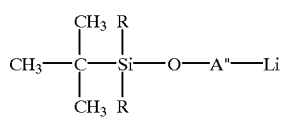 (2)

wherein each R is methyl, ethyl, n-propyl, or n-butyl and A" is an alkyl substituted or non-substituted propyl bridging group, including —CH$_2$—CH$_2$—CH$_2$— (1,3-propyl), —CH$_2$—CH(CH$_3$)—CH$_2$— (2-methyl-1,3-propyl) and —CH$_2$—C(CH$_3$)$_2$—CH$_2$— (2,2-dimethyl-1,3-propyl) or an alkyl-substituted or non-substituted octyl bridging group, including —CH$_2$—CH$_2$—CH$_2$—CH$_2$—CH$_2$—CH$_2$—CH$_2$—CH$_2$— (1,8-octyl), because these initiators will initiate polymerization of anionic polymers at surprisingly higher polymerization temperatures with surprisingly lower amounts of dead initiator (higher efficiency) than similar initiators wherein A" is replaced by alkyl-substituted or non-substituted butyl, pentyl, or hexyl bridging groups, such as CH$_2$—CH$_2$—CH$_2$—CH$_2$— (1,4-butyl), CH$_2$—CH$_2$—CH$_2$—CH$_2$—CH$_2$— (1,5-pentyl), or CH$_2$—CH$_2$—CH$_2$—CH$_2$—CH$_2$—CH$_2$— (1,6-hexyl).

Certain hydroxylated polydiene polymers useful in the present invention have the structural formula (I) HO—A—OH or (HO—A)$_n$—X wherein A is a homopolymer of a conjugated diolefin monomer, a copolymer of two or more conjugated diolefin monomers, or a copolymer of one or more conjugated diolefin monomers with a monoalkenyl aromatic hydrocarbon monomer, where n>1 and where X is the residue of a coupling agent. During the preparation of these hydroxylated polydiene polymers, it is possible to make some mono-functional polymer having the structural formula HO—A, either by incomplete capping of the living polymer or by incomplete coupling via the coupling agent. Although it is preferred that the amount of this mono-functional polymer is minimal, satisfactory crosslinked compositions within this invention can be achieved even when the amount of mono-functional polymer is as high as 50% w of the hydroxylated polymer in the composition.

Other hydroxylated polydiene polymers useful in the present invention have the structural formula (II) HO—A—S$_z$—B—OH or (HO—A—S$_z$—B)$_n$—X or
HO—S$_z$—A—B—S$_y$—OH or (HO—S$_z$—A—B)$_n$—X wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, where S is a vinyl aromatic polymer block, where y and z are 0 or 1, where n is greater than or equal to 1, and where X is the residue of a coupling agent.

These polymers may contain up to 60% by weight of at least one vinyl aromatic hydrocarbon, preferably styrene. The A blocks and the B blocks can have a molecular weight of from 100 to 500,000, preferably 500 to 50,000, and most preferably 1,000 to 20,000. The S block which may have a molecular weight of from 500 to 50,000. Either the A or the B block may be capped with a miniblock of polymer, 50 to 1,000 molecular weight, of a different composition, to compensate for any initiation, tapering due to unfavorable copolymers rates, or capping difficulties.

The molecular weights of the polymers are conveniently measured by Gel Permeation Chromatography (GPC), where the GPC system has been appropriately calibrated. The polymers can be characterized from the data in the chromatogram by calculating the number-average molecular weight (Mn), by calculating the weight-average molecular weight (Mw) or by measuring the "peak" molecular weight. The peak molecular weight is the molecular weight of the main specie shown on the chromatogram. For anionically polymerized linear polymers, the polymer is nearly monodisperse (Mw/Mn ratio approaches unity), and usually it is adequately descriptive to report the peak molecular weight of the narrow molecular weight distribution observed. Usually, the peak molecular weight value is between Mn and Mw. For polydisperse polymers the number average molecular weight should be calculated from the chromatograph and used. The materials used in the columns of the GPC are styrene-divinyl benzene gels or silica gels. The solvent is tetrahydrofuran and the detector is a refractive index detector.

The polymers of this invention may be hydrogenated as disclosed in U.S. Pat. No. Reissue 27,145 which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalyst and titanium catalysts as in U.S. Pat. No. 5,229,464 which is also incorporated herein by reference.

The isocyanate used in this invention is an isocyanate having an average functionality of two or more isocyanate groups per molecule. Examples of suitable diisocyanates are 2,4-toluene di-isocyanate, 4,4'-diphenylmethane di-isocyanate, mixtures of isomers of diphenylmethane di-isocyanate, paraphenyldiisocyanate, isophoronediisocyanate, 4,4'-methylene-bis (cyclohexylisocyanate), naphthalene di-isocyanate, hexamethylene di-isocyanate, isocyanates that have been extended by reaction to reduce volatility such as polymeric diphenylmethane di-isocyanate etc. Two or greater functionality isocyanate prepolymers made by reaction of an isocyanate with a difunctional chain extender may also be used.

The chain extenders that may optionally be added are low molecular weight diols having two hydroxyl groups per molecule. The preferred chain extenders have methyl, ethyl, or higher carbon side chains which make these diols more apolar and therefore more compatible with the apolar hydrogenated polydienes. Examples of such chain extenders are 2-methyl-1,3-propanediol, 2-ethyl-1,3-hexanediol, 2,2-dimethyl-1,3-pentanediol, 2-ethyl-2-butyl-1,3-propanediol, and 2,2,4-trimethyl-1,3-pentane diol. Linear chain extenders without carbon side chains such as 1,4-butane diol, ethylene diamine, 1,6-hexane diol, and the like, also result in polyurethane compositions if the components are well mixed or if a prepolymer method is used to improve compatibility.

A preferred way to make cast elastomers is by the prepolymer method where an excess of the isocyanate component is reacted first with the polydiene diol to form an isocyanate terminated prepolymer, which can then be reacted further with the amine curing agent of choice. The reaction with the curing agent can optionally include an additional isocyanate component to reach the desired hard segment content. The hard segment determines the stiffness of the final composition and consists of the isocyanate, curing agent and optionally any chain extending diol. The polyurethane compositions can be formulated to make cast elastomers using a solventless prepolymer method or a solvent/prepolymer method as described in more detail below.

In the solventless prepolymer method, the hydrogenated polydiene diol is heated to at least 70° C., preferably less than 100° C., and then mixed with the desired amount of isocyanate. If the prepolymer reaction is slow, the addition of catalysts such as organo-tin compounds can substantially accelerate the reaction. The prepolymer is stored under nitrogen prior to heating to a temperature from 90° C. to 100° C. The desired amount of amine curing agent, and optionally additional isocyanate, are added and thoroughly mixed before pouring into a heated mold treated with a mold release compound. The cast polyurethane elastomer composition is formed by curing in the mold at 80° C. to 120° C. for approximately one hour. Optionally$_1$ the composition can be postcured above 100° C. for at least 2 hours.

In the solvent/prepolymer method, the polydiene diol is dissolved in a solvent, preferably dry toluene, heated to at least 70° C. and not more than 100° C., and then mixed with the appropriate amount of an isocyanate having two or more isocyanate groups per molecule, and optionally a diol chain extender, for at least 1 hour under nitrogen flow. After the solvent is removed, the amine curing agent and optional additional isocyanate are added, mixed thoroughly, then poured into a preheated mold for curing and postcuring as described above.

In either case, the curing is done in the presence of an aromatic amine crosslinker with a relatively low polarity as determined by a solubility parameter of less than 10.5 $(cal/cm^3)^{0.5}$. This ensures good compatibility which, in turn produces uniform materials with good physical properties. The most commonly used curing agent for cast elastomer is methylene bis(2-chloroaniline) (MCBA) which has a solubility parameter of 12.66. The solubility parameter is determined by the method described by Coleman, Graf, and Painter in their book *Specific Interactions and the Miscibility of Polymer Blends,* Technomics Publishing Company, 1991. This is a group contribution method in which the contribution of each segment of the molecule, such as —$CH_2$— or $NH_2$ which are based on a consistent set of molar values are combined to determine the solubility parameter of the total molecule. Hydrogen bonding interactions are not included in this calculation. Curing agents which can be used to achieve the improved compositions of this invention are those which have a solubility parameter of less than 10.5, preferably 7 to 10.5. Examples of such curing agents are 4,4'-methylene bis(3-chloro-2,6-ethylaniline) available from Air Products Corporation and diethylene toluene diamine available from Ethyl Corporation.

A composition of the instant invention may contain plasticizers, such as oils used in conventional rubber compounds. Unlike typical commercial cast elastomers based on polyether, polycarbonate, or polyester diols, such oils can be used in the present cast elastomers because the polydiene diol is a hydrocarbon rubber. Rubber compounding oils are well known in the art and include both high saturates content oils and high aromatics content oils. Preferred plasticizers are highly saturated oils (like Tufflo® 6056 and 62024 oil made by Arco) and process oils (like Shellflex® 371 oil made by Shell). The amounts of rubber compounding oil employed in the invention composition can vary from 0 to about 500 phr, preferably between about 0 to about 100 phr, and most preferably between about 0 and about 60 phr.

A wide variety of fillers, dyes, and pigments can be used in formulations with the present invention. Suitable fillers include calcium carbonate, clays, talcs, zinc oxide, titanium dioxide, silica, and the like. The amount of filler usually is in the range of 0 to about 800 phr, depending on the type of filler used and on the application for which the formulation is intended. Preferred fillers are silica and titanium dioxide. The filler should be thoroughly dried in order that adsorbed moisture will not interfere with the reaction between the polyisocyanate and the saturated, polyhydroxylated polydiene polymer.

Stabilizers known in the art may also be incorporated into the composition. These may be for protection during the life of the finished product against, for example, oxygen, ozone, and ultra-violet radiation. These may also be for stabilization against thermo-oxidative degradation during elevated temperature processing. Antioxidants and UV inhibitors which interfere with the urethane curing reaction must be avoided. Preferred antioxidants are the sterically hindered phenolic compounds like butylated hydroxy toluene. Stabilizers such as organic phosphites are also useful. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than about 1 phr. If the polyurethane product will be processed at high temperature or if the product must survive many years in service, stabilizer concentration could be as much as about 10 phr.

Applications for cast elastomers are divided into high performance hot processing cast polyurethane elastomers and low performance room temperature processing cast polyurethane elastomers. High performance, high temperature cast polyurethane elastomer applications include; rolls (print rollers, coil coating rolls, paper mill rolls) wheels and tires (for fork lifts, pallet wheels, casters, roller coaster wheels, and the like), mechanical goods (impellers, bearings, pads, belts, bushings, gaskets, gears, hoses, O-rings, pulleys, seals, sprockets, vibration mounts, valve liners, washers, and the like). Low performance applications include tire filling compounds, potting and encapsulants, pipe seals, athletic surfaces and rocket binders.

EXAMPLES

Chemicals

All chemicals used to make these cast elastomers are listed in Table 1. Polyols and chain extenders were dried under vacuum or 1–3mm Hg at 70° C. overnight prior to usage. Isocyanates were used as received from the suppliers. The toluene used in the reactivity study was dried over 4A molecular sieves for at least 24 hours prior to use.

TABLE 1

Materials Used to Make Cast Elastomers

| Designation | Chemical Identification | Eq. Wt. | Supplier |
|---|---|---|---|
| KLP L-2203 | Hydroxyl terminated poly-(ethylene-butylene) oligomer | 1753 | Shell Chemical Co. |
| PTMO 2000 | Poly(oxytetramethylene) glycol | 1024 | E. I. duPont de Nemours & Co. |
| PPG P-2010 | Poly(oxypropylene) glycol | 998 | BASF Corporation |
| Poly-L225-28 | Poly(oxypropylene) glycol | 2000 | Olin Chemical Co. |
| Mondur M (MDI) | 1,4-diphenylmethane diisocyanate | 125 | Bayer AG |
| Isonate 143L | Carbodiimide-modified MDI | 143 | Dow Chemical Co. |
| PAPI-901 | Polymeric MDI | 132 | Dow Chemical Co. |
| IPDI | Isophorone diisocyanate | 111 | Olin Corporation |
| TDI (Mondur, TDS Grade II) | Toluene diisocyanate | 87 | Bayer AG |
| Desmodur W | Methylene bis(4-cyclohexyl-isocyanate) | 131 | Bayer AG |
| HDI | 1,6-hexamethylene diisocyanate | 84 | Bayer AG |
| 1,4-BD | 1,4-butanediol | 45 | GAF Corp. |
| 1,6-HD | 1,6-hexanediol | 59 | BASF Corp. |
| 2-Ethyl-1,3-hexanediol | 2-ethyl-1,3-hexanediol | 73 | Spectrum Chemical Mfg. Corp. |
| TMPD | 2,2,4-trimethyl-1,3-pentanediol | 73 | Aldrich Chemical Co. |
| BEPD | 2-butyl-2-ethyl-1,3-propanediol | 80 | Eastman Kodak Chemical Co. |
| HQEE | Hydroquinone di-(2-hydroxyethyl) ether | 99 | Eastman Kodak Chemical Co. |
| CURENE-442 (MCBA) | 4,4'-methylene bis(2-chloroaniline) | 133 | Anderson Development Co. |
| LONZACURE M-CDEA | 4,4'-methylene bis(3-chloro-2,6-diethylaniline) | 190 | Air Products |
| ETHACURE 300 | 3,5-dimethylthio-2,4-toluenediamine/3,5-dimethylthio-2,6-toluenediamine | 107 | Albemarle Corporation |
| POLACURE 740M | Trimethylene glycol di-p-aminobenzoate | 157 | Air Products |
| DETDA | Diethylene toluene diamine | 89 | Ethyl Corporation |
| T-12 | Dibutyltin dilaurate | | Air Products |

The OH-number determination

The OH-numbers of the polydiene diols, and some reference polyols were determined by using three methods, proton nuclear magnetic resonance spectroscopy (H1NMR), ASTM D-2849 (Method C), and by reaction with phenyl isocyanate. The OH-numbers determined by these methods were in good agreement, and especially the OH-numbers derived from the H1NMR and the phenyl isocyanate methods. In this case, the ASTM-2849 method was somewhat modified. After the reaction between phthalic anhydride and polyol at 105° C. was completed, the titration of the remaining anhydride was carried out at 100° C. instead at room temperature, as prescribed in the ASTM-2849 procedure. When titration was carried out at room temperature, the hydrophobic hydrocarbon polyols precipitated and interfered with the titration. At 100° C., the polyol precipitation was significantly reduced.

Molecular weight determination

The average polyol molecular weight was determined by means of gel permeation chromatography and vapor pressure osmometry (VPO) method using an Osmomat 070 instrument. The calibration was carried out by using benzil as a standard in toluene as a solvent. Toluene was used also as a solvent in the polyol molecular weight determination.

Compatibility

The compatibility of hydrocarbon-based polyols with the amine curing agents was studied by mixing the components at a specified weight ratio at 110° C. Visual observation of the mixtures at 110° C. and after cooling at room temperature were recorded.

The physical and mechanical properties of polyurethane elastomers were determined by the following test methods:

Shore hardness (ASTM D-2240-75)

Stress-strain properties (tensile strength at break, ultimate elongation, 100% and 300% modulus).

The glass transition temperature (Tg) was measured by differential scanning calorimetry (DSC). The softening of polyurethane elastomers was measured by thermo-mechanical analysis (TMA).

The basic properties of diols (both of the invention and comparative commercial polyol PTMO 2000) which are utilized in this study are shown in Table 2. The number average molecular weight of KLP diols, as determined by the VPO method, was found to be in good correlation with the number average molecular weight calculated from the GPC data. All of these data were in good agreement with data supplied by the manufacturers.

TABLE 2

Properties of Polyols

| Polyol Type | KLP L-2203 Lab Scale | KLP L-2203 Commercial Scale | PTMO 2000 |
|---|---|---|---|
| OH number (ASTM C-2849) | 27.9 | 28.4 | 52.5 |
| OH number (phenyl isocyanate method) | 31.7 | 29.4 | |
| OH Number (supplied by the manufacturer) | 32.2 | 30.5 | 54.8 |

TABLE 2-continued

Properties of Polyols

| Polyol Type | KLP L-2203 Lab Scale | KLP L-2203 Commercial Scale | PTMO 2000 |
|---|---|---|---|
| Molecular weight (VPO, g/mol) | 3540 | 3250 | 2090 |
| Molecular weight (GPC, g/mol) | 3430 | 3330 | 2050 |
| Viscosity at 20° C. (cps, mPa.s) | | 50,000* | solid |
| Viscosity at 40° C. (cps, mPa.s) | | 12,000 | |
| Viscosity at 80° C. (cps, mPa.s) | | 1200 | |
| Tg (DSC, ° C.) | −50 | −50 | −70 |

*Typical viscosity for KLP L-2203.

The compatibility of mixtures of KLP L-2203 with aliphatic chain extenders at a 10:1 ratio also declined as polarity increased: 2,2,4 trimethyl 1,3-pentane diol (TMPD) ~2-butyl, 2-ethyl, 1,3 propane diol (BEPD)~2-ethyl-1,3-hexanediol (compatible)>1,6-hexanediol>1,4-butanediol (partially compatible)>hydroquinone ethoxy ethanol (HQEE) (incompatible). Similarly, differences in polarity of aromatic amine crosslinkers affect their compatibility with KLP L-2203: diethylene toluene diamine (DETDA-solubility parameter-9.73)>4,4'-methylene-bis(3-chloro-2,6-diethylaniline) (LONZACURE M-CDEA-solubility parameter-9.81)>3,5-dimethyl-2,4-toluenediamine/3,5-dimethylthio-2,6-toluenediamine (ETHACURE 300-solubility parameter-10.57)>4,4'-methylene bis(2-chloroaniline) (MCBA, also, CURENE 442-solubility parameter-12.66)>trimethylene glycol di-p-aminobenzoate (POLACURE 740M-solubility parameter-11.69).

2/1. The prepolymer synthesis was carried out by the following procedure: the TDI was placed in a 0.5 L glass reaction kettle, which was equipped with a mechanical stirrer, thermometer, heating mantle, and a gas inlet and outlet for continuous flow of nitrogen. When the temperature of the isocyanate reached 70° C., the diol of the present invention (KLP L-2203) was added in several portions to the reactor under constant mixing. The reaction temperature was maintained at 70–80° C. and periodic samples were withdrawn to determine the isocyanate content. After the theoretical NCO % value was reached, the reaction was stopped by cooling and the reaction product was stored in a sealed glass bottle under nitrogen. In the second step, a specified amount of free TDI (or MDI) as shown in Table 4 (the amount needed for 22% hard segment concentration) was added under vigorous mixing to the prepolymer which was preheated at 100° C. The chain extender (melted, if needed) was added to the prepolymer under vigorous mixing (30–40 sec.). At the gel point (2–3 min.), the mold was compressed to 20,000 psi for one hour at either 105° C. or 115° C. as noted in Table 4. The mold was then placed in an oven at 105° C. or 115° C. for 16 hours for postcuring.

The formulations and properties of KLP L-2203 based cast elastomers are shown in Table 4. The cast elastomers were prepared utilizing the above-described hindered aromatic amine crosslinkers: Examples 1–3 were cured with Lonzacure M-CDEA, Comparative Example C1 with Curene 442, Comparative Example C2 with Ethacure 300, and Comparative Examples C3 with Polacure 740M. The reaction of prepolymer with DETDA was too rapid to allow preparation of testable samples, however, commercial equipment would be capable of making materials based on

TABLE 3

Miscibility of KLP L-2203 Diol With Chain Extenders and Crosslinkers

| Chain extenders/ crosslinkers | KLPL-2203/extender weight ratio | Temp. (° C.) | Miscibility with KLP L-2203 |
|---|---|---|---|
| CURENE 442 | 1/0.14 | 110 | Phase separation |
| POLACURE 740M | 1/0.15 | 140 | Phase separation |
| ETHACURE 300 | 1/0.13 | 110 | Clear and homogeneous |
| LONZACURE M-CDEA | 1/0.16 | 110 | Clear and homogeneous |
| DETDA | 1/0.10 | 110 | Clear and homogeneous |
| 1,4-BD | 1/0.06 | 80 | Hazy |
| | | 105 | Hazy, but clearer than at 80° C. |
| 1,6-HD | 1/0.07 | 80 | Hazy |
| | | 105 | Hazy, but clearer than at 80° C. |
| TMPD | 1/0.08 | 80 | Clear and homogeneous |
| BEPD | 1/0.08 | 80 | Clear and homogeneous |
| 2-Ethyl-1,3-hexanediol | 1/0.08 | 80 | Clear and homogeneous |
| HQEE | 1/0.09 | 130 | Phase separation |
| HQEE + TMPD (up to 30% HQEE) | | 130 | Phase separation |

(The ratio by weight of polyol to chain extenders is calculated based on elastomer formulations at 22% hard segment and isocyanate index=104.)

Cast polyurethane elastomers were prepared utilizing the prepolymer method. In the first step, the NCO-terminated prepolymer was prepared by reacting toluene diisocyanate (TDI), or 4,4'-diphenylmethane di-isocyanate (MDI) in Example 2, and polyol at an NCO/OH equivalent ratio of DETDA. Cast elastomers based on the least polar amine and the one with the lowest solubility parameter, Lonzacure M-CDEA, exhibited higher hardness and stress-strain properties than those based on MCBA or Ethacure 300. POLACURE 740M was so incompatible that early phase separation caused the resin not to cure. The lower properties of MCBA based elastomers was also due to poor compatibility with KLP L-2203.

TABLE 4

Properties of the Polyurethane Elastomers Based on KLP L-2203 Diol, TDI (or MDI) and Different Amino-Functional Chain Extenders by the Prepolymer Method at 1.05 Isocyanate to Amine Equivalent Ratio

| Example | 1 | 2 | 3 | C1 | C2 | C3 |
|---|---|---|---|---|---|---|
| Formulation (pbw) | | | | | | |
| TDI Prepolymer (NCO/OH = 2) | 45 | | 45 | 45 | 45 | 45 |
| TDI | 1.06 | | 1.06 | 1.83 | 2.35 | 6.32 |
| MDI Prepolymer (NCO/OH = 2) | | 45 | | | | |
| MDI | | 0.565 | | | | |
| CURENE 442 (MCBA) | | | | 5.65 | | |
| ETHACURE 300 | | | | | 5.13 | 9.78 |
| LONZACURE M-CDEA | 6.42 | 4.93 | 6.42 | | | |
| Hard segment (%) | 22 | 22 | 22 | 22 | 22 | 33 |
| Curing (1 hr) and Post Curing (24 hrs) Temperatures (° C.) | 115 | 115 | 105 | 115 | 105 | 105 |
| Properties | | | | | | |
| Hardness (Shore A) | 74 | 71 | 73 | 59 | 60 | 69 |
| Ultimate tensile strength, psi (MPa) | 2160 (14.9) | 2750 (19.0) | 1620 (11.2) | 1010 (7.0) | 1450 (10.0) | 1000 (6.9) |
| Elongation at break (%) | 586 | 736 | 461 | 900 | 515 | 445 |
| Modulus at 100% elongation, psi (MPa) | 630 (4.3) | 490 (3.4) | 560 (3.9) | 210 (1.4) | 380 (2.6) | 400 (2.8) |
| Modulus at 300% elongation, psi (Mpa) | 1273 (8.8) | 1022 (7.1) | 1145 (7.9) | 390 (2.7) | 900 (6.2) | 790 (5.5) |
| Softening Temperature (° C.) | 311 | NR | 204 | NR | 187 | 185 |

The tensile strength of cast elastomers based on Lonzacure M-CDEA and MDI (2750 psi) was higher than that based on TDI (2160 psi), as expected. The mechanical properties of the KLP L-2203 based cast elastomers were also affected by the curing temperature, e.g. the tensile strength of the Lonzacure M-CDEA/TDI based elastomers increased up to 33% when the curing temperature was increased from 105° to 115° C. The TMA softening temperature of Example 1 was very high, 300° C. The softening temperature of Example C2, Ethacure 300-based elastomers was lower, 188° C. (curing temperature 105° C.).

These cast elastomers show very clean phase separation between the soft and hard segments. This not only provides a very broad service temperature range but indicates that these materials will show low hysteretic heat build-up in high mechanical intensity applications such as rollers and tires.

Comparative Examples C4, C5, and C6 were made using conventional polyols by the same methods as Examples 1–3 and C1–C3. These properties are shown in Table 5. The water resistance of cast elastomers based on KLP L-2203, PPG 2000, PPG 400 AND PTMO 2000 was tested by measuring the change of mechanical properties upon immersion in 100° C. (boiling) water for seven days (Table 5). The elastomers based on PPG diols and PTMO 2000 underwent almost complete failure. KLP L-2203 elastomers withstood this test very well. The Lonzacure M-CDEA-based elastomers exhibited a small decrease in the tensile is strength (18%), due to plastization by water—an excellent retention of properties. The tensile strength of Ethacure 300 crosslinked elastomers increased somewhat (10%). In the latter case, this is most probably due to poor initial cure because of the slight incompatibility during curing. The strength of the MCBA cured elastomer increased by 100% due to even poorer compatibility during cure.

TABLE 5

The effect of aging in 100° C. water for 7 days on Cast Elastomer Properties

| Example | 1 | C2 | C1 | C4 | C5 | C6 |
|---|---|---|---|---|---|---|
| Polyol | L-2203 | L-2203 | L-2203 | PTMO 2000 | PPG 2000 | PPG 4000 |
| Curing Agent | Lonzacure M-CDEA | Ethacure 300 | MCBA | MCBA | MCBA | MCBA |
| Original Properties | | | | | | |
| Hardness Shore A | 74 | 60 | 59 | 89 | 86 | 75 |
| Tensile Strength (psi) | 2160 | 1450 | 1010 | 5410 | 1360 | 1480 |
| Elongation at Break (%) | 590 | 520 | 900 | 450 | 700 | 1150 |
| Properties after Aging | | | | | | |
| Hardness Shore A | 68 | 60 | 69 | 78 | 66 | * |

TABLE 5-continued

The effect of aging in 100° C. water for 7 days on Cast Elastomer Properties

| Example | 1 | C2 | C1 | C4 | C5 | C6 |
|---|---|---|---|---|---|---|
| Tensile Strength (psi) | 1760 | 1660 | 2070 | 390 | 86 | * |
| Elongation at Break (%) | 655 | 850 | 1050 | 110 | 18 | * |

*Sample underwent complete failure during aging.

We claim:

1. A cast polyurethane produced by a process comprising reacting (a) a polydiene diol having up to 2 terminal hydroxyl groups per molecule and a number average molecular weight between 500 and 20,000 with (b) an isocyanate or isocyanate prepolymer having two or more isocyanate groups per molecule, and then curing the reaction product with 4,4'-methylene-bis(3-chloro-2,6-diethylaniline).

2. The polyurethane of claim 1 wherein the polydiene diol has from 1.8 to 2 hydroxyl groups per molecule.

3. The polyurethane of claim 1 wherein the polydiene diol is a hydrogenated polybutadiene diol.

4. The polyurethane of claim 3 wherein the polydiene diol has no less than 30% by weight 1,2 butadiene addition.

5. The polyurethane of claim 4 wherein the polydiene diol is a hydrogenated polybutadiene diol having from 1.9 to 2 terminal hydroxyl groups per molecule, 1,2-addition between 40% and 60%, and a number average molecular weight between 1,000 and 20,000.

6. The polyurethane of claim 1 wherein the polydiene diol is a hydrogenated polyisoprene diol.

7. The polyurethane of claim 1 wherein the polydiene diol is an hydrogenated polyisoprene diol having greater than 80% by weight 1,4 isoprene addition.

8. A cast polyurethane produced by a process comprising reacting (a) a polydiene polyol having a number average molecular weight between 500 and 500,000 with (b) an isocyanate or isocyanate prepolymer having two or more isocyanate groups per molecule, and then curing the reaction product with 4,4'-methylene-bis(3-chloro-2,6-diethylaniline).

9. The polyurethane of claim 8 wherein the polydiene polyol is a hydrogenated polybutadiene polyol.

10. The polyurethane of claim 9 wherein the polydiene polyol has no less than 30 percent by weight 1,2-butadiene addition.

11. The polyurethane of claim 9 wherein the polydiene polyol has from 40 to 60 percent 1,2-butadiene addition.

12. The polyurethane of claim 8 wherein the polydiene polyol is a hydrogenated polyisoprene diol.

13. The polyurethane of claim 12 wherein the polydiene polyol has greater than 80 percent 1,4-isoprene addition.

14. The polyurethane of claim 8 wherein the polydiene polyol contains up to 3 hydroxyl groups per molecule.

15. A cast polyurethane produced by a process comprising reacting (a) a radial or star polydiene polyol having terminal hydroxyl groups on most or all of the arms and a number average molecular weight between 500 and 500,000 with (b) an isocyanate or isocyanate prepolymer having two or more isocyanate groups per molecule, and then curing the reaction product with 4,4'-methylene-bis(3-chloro-2,6-diethylaniline).

16. The polyurethane of claim 15 wherein the polydiene polyol is a hydrogenated polybutadiene polyol.

17. The polyurethane of claim 16 wherein the polydiene polyol is a hydrogenated polyisoprene polyol.

* * * * *